United States Patent

[11] 3,568,187

| [72] | Inventors | Bartow Bechtel<br>Mountain View, Calif.;<br>Grady D. Satterwhite; James H. Sharp,<br>Dallas, Tex. |
|---|---|---|
| [21] | Appl. No. | 163,358 |
| [22] | Filed | Dec. 29, 1961 |
| [45] | Patented | Mar. 2, 1971 |
| [73] | Assignee | Texas Instruments Incorporated<br>Dallas, Tex. |

[54] TERRAIN AVOIDANCE RADAR SYSTEM
12 Claims, 6 Drawing Figs.

[52] U.S. Cl. .................................................. 343/7
[51] Int. Cl. .................................................. G01s 9/02
[50] Field of Search ..................................... 343/7—7.6,
7 (TA); 328/138, 129—131, 115

[56] References Cited
UNITED STATES PATENTS

| 2,824,285 | 2/1958 | Hunt | 328/129 |
| 2,965,894 | 12/1960 | Sweeney | 343/7 |
| 3,012,721 | 12/1961 | Fiske | 343/7.3 |
| 3,031,656 | 4/1962 | Wood | 343/7.3 |

*Primary Examiner*—Rodney D. Bennett, Jr.
*Assistant Examiner*—T. H. Tubbesing
*Attorneys*—Samuel M. Mims, Jr., James O. Dixon, Andrew M. Hassell and Stevens, Davis, Miller & Mosher

ABSTRACT: The present invention relates to radar systems and more particularly relates to a terrain avoidance system for monitoring and detecting terrain and other obstacles in the path of an airborne vehicle and automatically programming the flight of the vehicle to avoid the detected obstacles.

INVENTORS
Bartow Bechtel,
Grady D. Satterwhite,
James H. Sharp
BY Stevens, Davis, Miller & Mosher
ATTORNEYS

TERRAIN AVOIDANCE RADAR SYSTEM

Radar systems which are intended for installation in aircraft to automatically control its flight path must meet many severe requirements. Not only must such systems possess a high degree of dependability, but they must also have relatively low complexity, light weight, and small size. Above all, the systems must fulfill their intended functions in all respects with a minimum possibility of failure.

The basic consideration in the operation of a terrain avoidance radar system is that of maintaining the airborne vehicle at a prescribed altitude above the terrain or obstacles arising therefrom under all conditions. In order to accomplish this result, the terrain avoidance radar system must maintain the airborne vehicle within prescribed altitude limits over level terrain, detect obstacles in the path of the vehicle in a sufficiently short period of time to permit the vehicle to obtain the desired altitude above the obstacle, and yet allow sufficient time to prevent undue stressing of the structural members of the airborne vehicle. After passing by the obstacle, the system must be able to return the vehicle to the proper altitude relative to new conditions. All obstacles in the flight path of the vehicle must be monitored until they are of no further interest, so far as the flight path of the vehicle is concerned, and the radar system must locate new obstacles and produce the required responses to them as dictated by the particular terrain encountered. Thus, the system must be able to monitor all obstacles at all times over its entire range of operation. Further, the system must be able to utilize, to the extent possible, existing systems in the airborne vehicle in order to minimize the additional equipment required.

It is a principal object of the present invention to provide a terrain avoidance radar system for airborne vehicles which best satisfies all of the above enumerated requirements.

It is a further object of the present invention to provide a relatively simple, lightweight, and compact automatic terrain avoidance system which is highly dependable and which is completely compatible with the existing radar equipment employed in both drone and manned aircraft.

It is another object of the present invention to provide a terrain avoidance radar system for airborne vehicles which will continually monitor an obstruction in the path of the vehicle and which will generate the appropriate control action from the time the obstruction first comes into the range of the radar until it is no longer of any interest with regard to the safety of the airborne vehicle.

It is a still further object of the present invention to provide a terrain avoidance radar system for aircraft which detects the presence of obstacles located within a unique predetermined radar scan profile, or template, and which automatically causes the aircraft to climb when an obstacle is detected within the scan profile and effects a descent of the aircraft when an object is not detected within the predetermined scan profile.

It is still another object of the present invention to provide a terrain avoidance radar system for aircraft which detects the presence of obstacles within a predetermined radar scan profile and accordingly generates a climb or dive command for the automatic pilot of the aircraft in such a manner that the flight commands are a function of the distance between the detected obstacle and the boundary of the guidance template.

In accordance with the objectives set forth above, the terrain avoidance radar system of the present invention comprises means for sending radar signals into a predetermined region in front of an airborne vehicle to detect the presence of an obstacle in the predetermined region, at least a portion of the boundary for the predetermined region lying at a distance from the airborne vehicle which varies in accordance with its angular position with respect to the airborne vehicle, means for receiving the return radar signals, a flight control logic network for deriving from the received radar signals proportional "Climb" and "Dive" flight control command signals to control the flight path of the airborne vehicle so as to avoid the detected obstacles, a bistable multivibrator for controlling the generation of the flight control command signals in the flight control logic network, means for placing the bistable multivibrator in its first stable state when a radar pulse is emitted into the predetermined region, and a variable time delay network for applying timing pulses to the bistable multivibrator to place it in its second stable state after sufficient time has elapsed for the radar pulse to travel to a point on the boundary for the predetermined region and back to the airborne vehicle. The magnitudes of the "Climb" and "Dive" flight control command signals generated by the flight control logic network vary as a function of the distance between the boundary of the guidance template and detected obstacle.

Other and further objects, advantages, and characteristic features of the present invention will become readily apparent from consideration of the following detailed description of preferred embodiments of the invention when taken in conjunction with the appended drawings in which.

Figure 2:
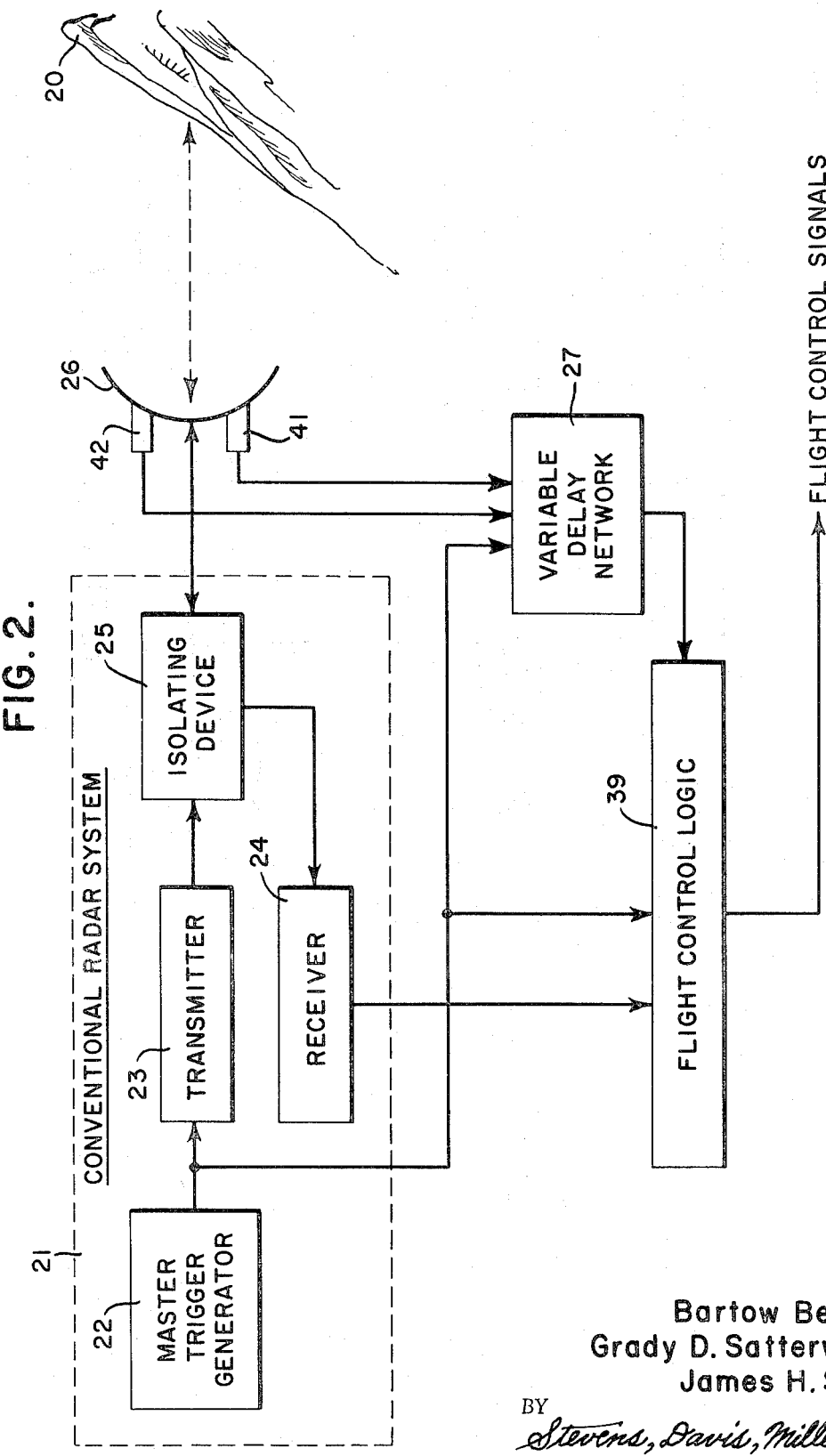
FIG. 2 is a simplified block diagram of the system of the invention.
Figure 3:
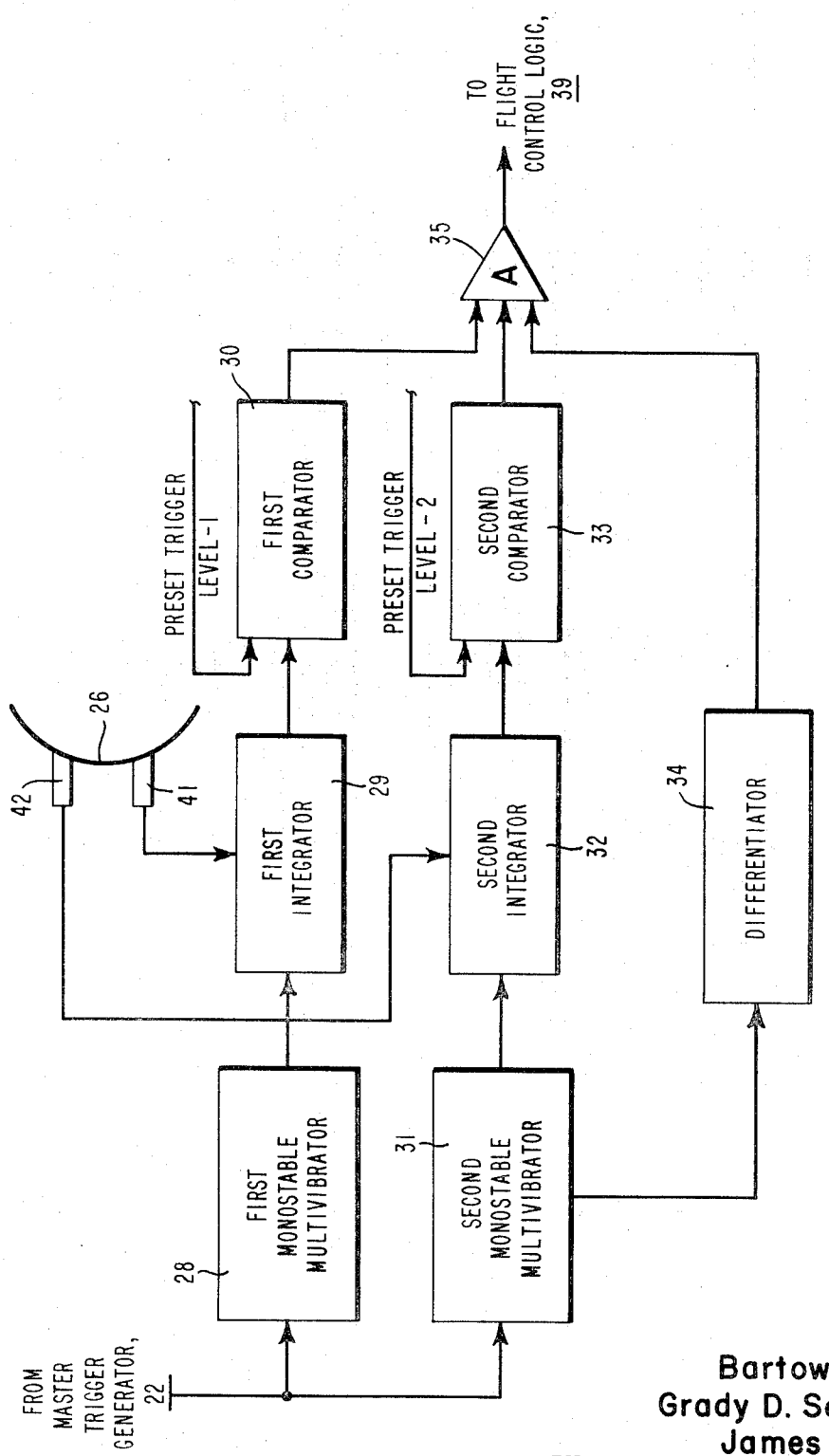
FIG. 3 is a block diagram of the elements comprising the variable delay network of FIG. 2.
Figure 4:
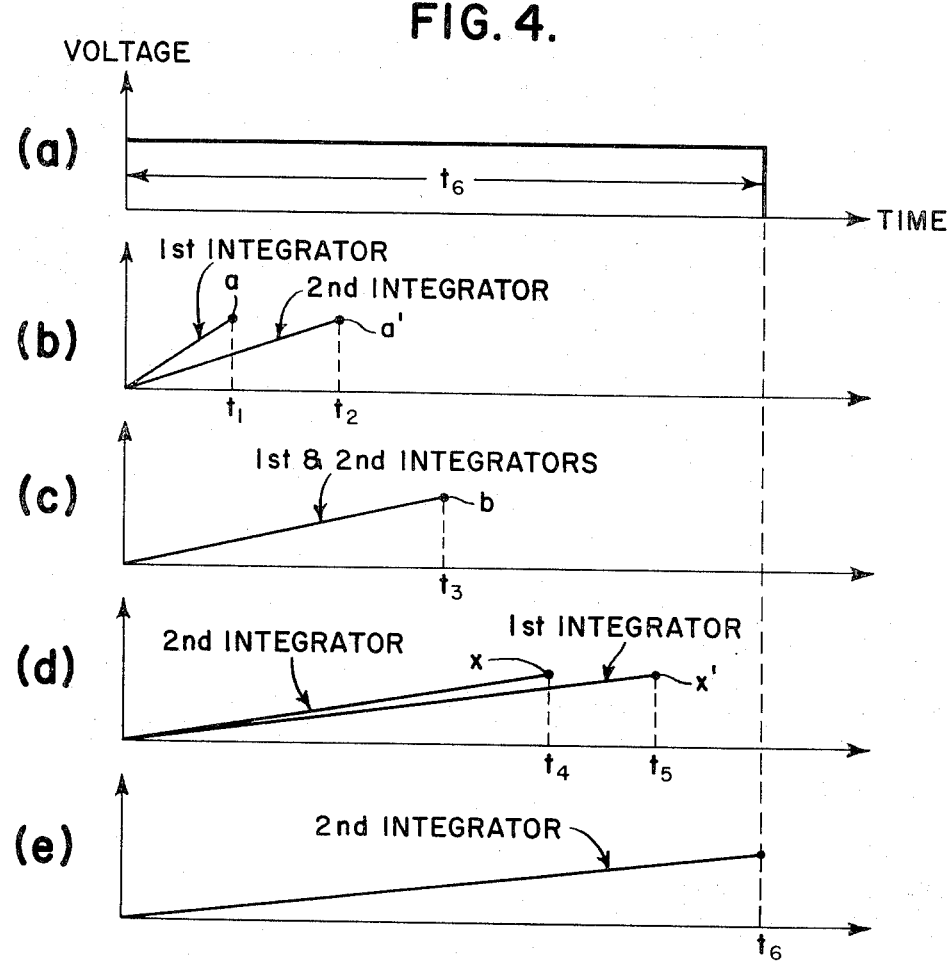
Figure 5:
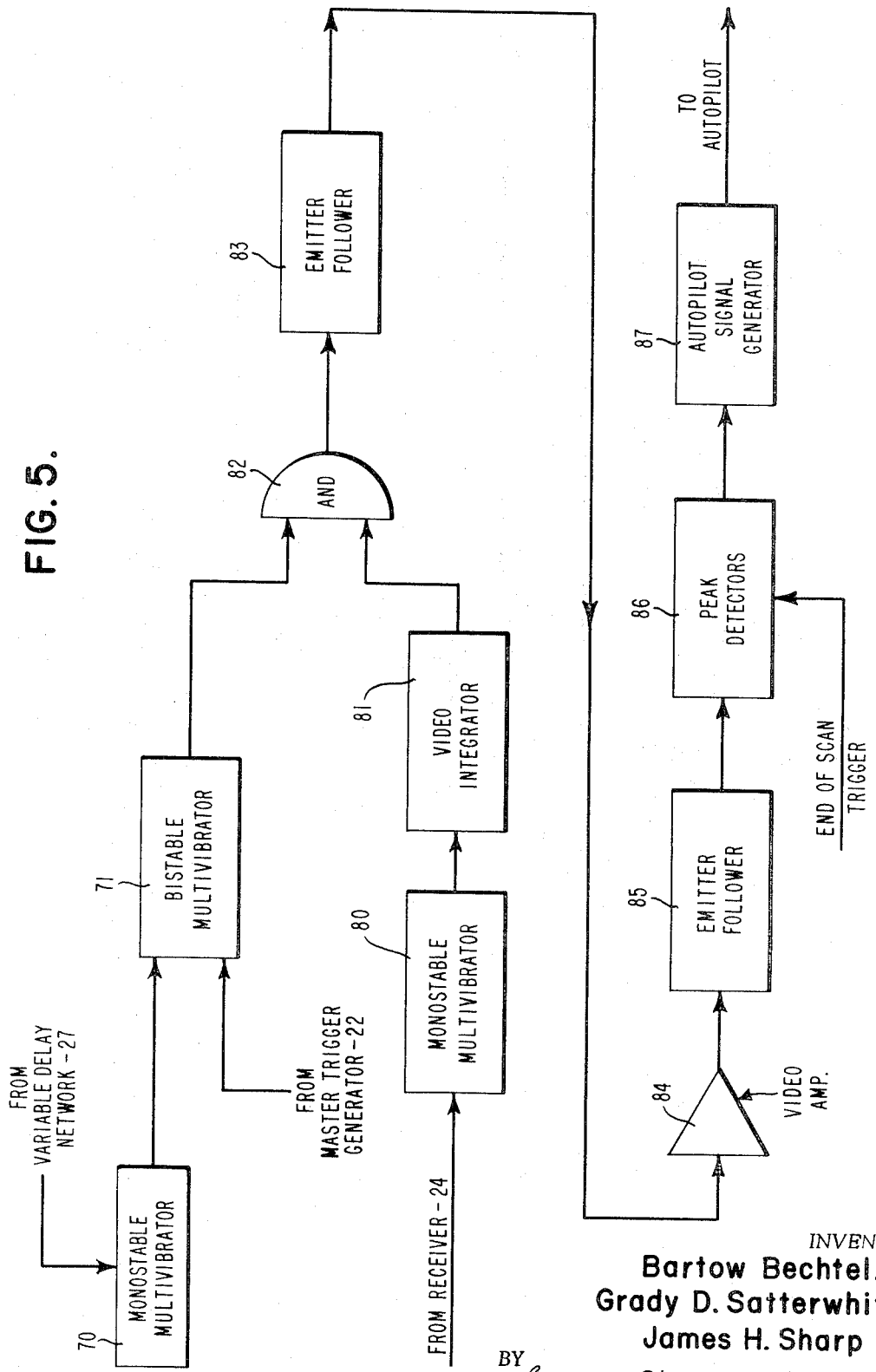
Figure 6:
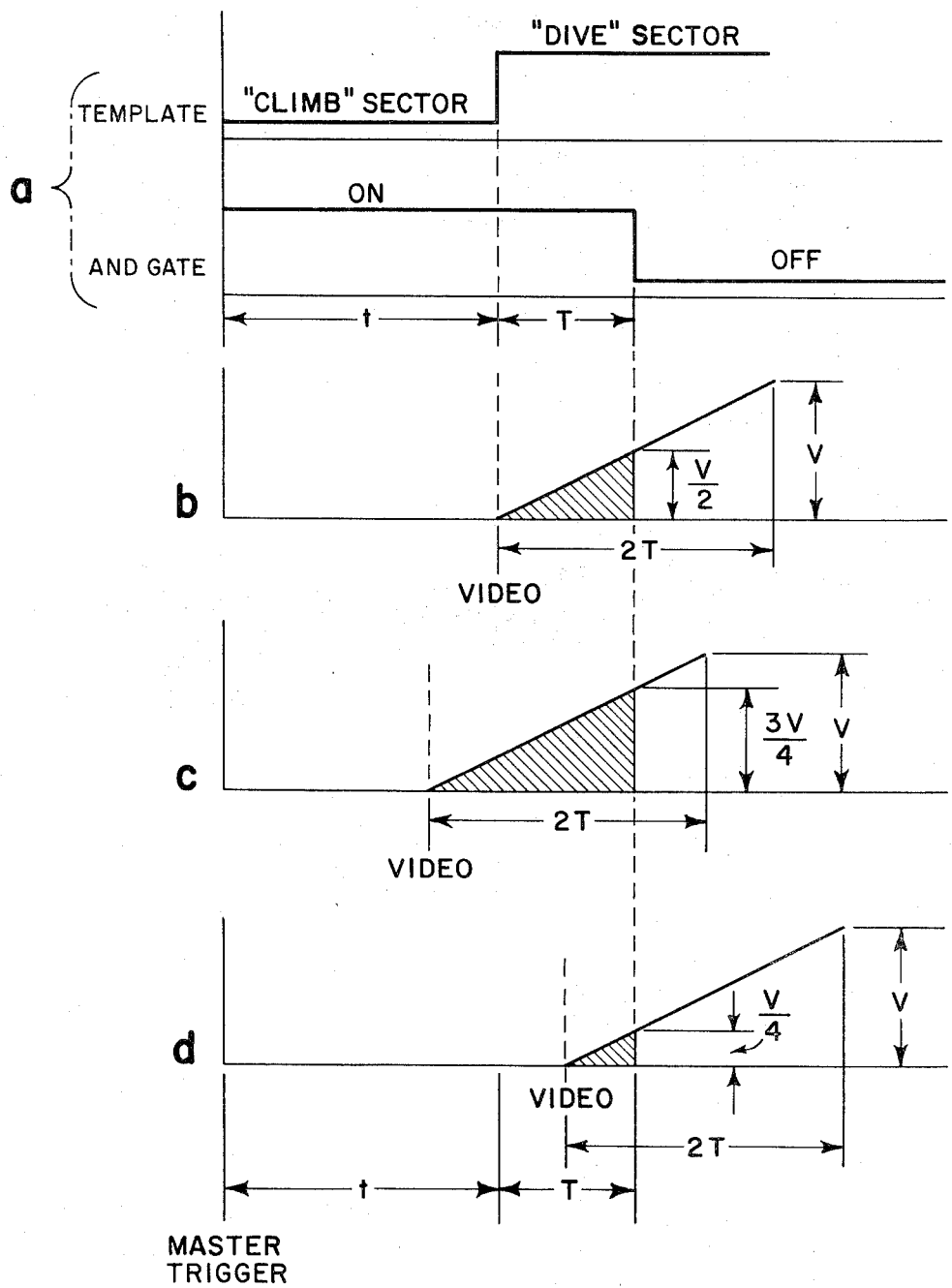

FIGS. 4 (a)—(e) illustrate exemplary waveforms which are used in explaining the operation of the variable delay network of FIG. 3;

FIG. 5 is a block diagram of the elements comprising the flight control logic of FIG. 2; and FIGS. 6 (a)—(d) illustrate exemplary voltage waveforms which are used in explaining the operation of the flight control logic of FIG. 5.

Figure 1:
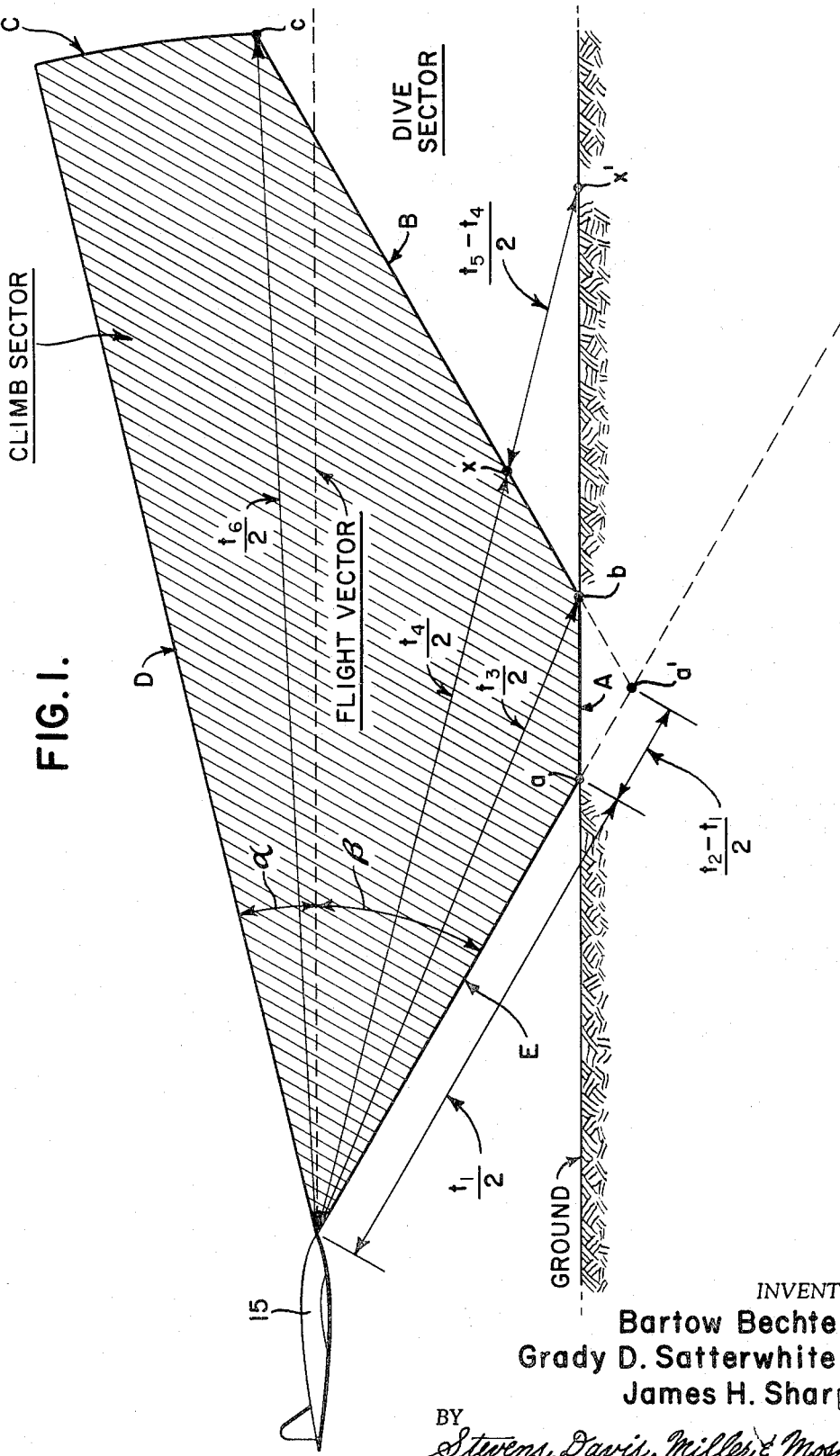
FIG. 1 is a vertical profile diagram illustrating the profile, or template, scanned by the radar antenna of the terrain avoidance system of the present invention.

Referring to FIG. 1 of the accompanying drawings, there is illustrated a diagram which will be used in describing the basic functioning of the system of the present invention. An aircraft 15, and in this particular embodiment of the invention the aircraft is taken to be a drone, is to be automatically maintained by the system of the invention essentially at a predetermined altitude above the surface of the surrounding terrain, designated as "ground" in FIG. 1. The aircraft 15 is provided with an antenna for transmitting and receiving pulses of electromagnetic energy. The antenna transmits pulses at a predetermined repetition rate, which for purposes of illustration is stated to be 4.0 kilocycles per second, and is swept through a predetermined vertical scan, of for example, from an angle of $\beta$ below the flight vector of the aircraft to an angle of $\alpha$ above the flight vector. In a practical system constructed according to the principles of the present invention $\beta$ might be around $-12°$, while $\alpha$ would be about $+10°$. The antenna scan is, of course, referenced or stabilized to the flight vector of the aircraft.

The antenna moves through a complete scan cycle, i.e., from its lower limit to its upper limit and then back to its lower limit of movement at a predetermined rate, which for purposes of example is taken to be two cycles per second. Thus, the antenna scans a predetermined sector in front of the aircraft four times each second, twice during its upward movement and twice on its downward movement. A typical maximum range of the radar, i.e., from the aircraft 15 to the curved front C of the scan profile, may be around 15,000 feet, when the aircraft is maintained at an altitude of between 200 and 1500 feet above the surrounding terrain.

The scan profile is shown in FIG. 1. The upper limit of the profile is defined by the line D extending from the aircraft 15 at a predetermined angle $\alpha$ above the flight vector of the aircraft. The maximum extent, or range, of the scan is determined by the curved line C which defines an arc of a circle whose center lies at the antenna on the aircraft 15 and whose radius is equal to the distance from the aircraft 15 to the arc C. The lower limit of the scan profile is defined by three lines. Line B, which intersects the arc C at a point $c$ slightly above the flight vector of the aircraft, is disposed at a relatively small angle with respect to the flight vector and extends from line C almost parallel to line D until it intersects the ground at point $b$. The distance from the aircraft to point $c$ is such that the travel time of a radar pulse from the aircraft 15 to point $c$ is equal to $t_6/2$, while the travel time of a pulse from the aircraft to point $b$ is $t_3/2$. Line A extends along the terrain, which for purposes of illustration will be assumed to be level ground, from point $b$ to point $a$ which is located at a distance from the aircraft corresponding to a radar pulse travel time of $t_1/2$. Line E, which is disposed between the radar antenna on the aircraft and point $a$, extends from the aircraft at a predetermined angle $\beta$ below the flight vector of the aircraft.

The area in the scan profile which is enclosed by the lines ABCDE is designated as the "Climb Sector", and if the radar locates any object within this sector, a command is generated and sent to the autopilot to program a climb for the aircraft. The area outside of the profile ABCDE is termed the "Dive Sector", and when an object is detected in the "Dive Sector" and no objects are detected in the "Climb Sector", a dive command signal is generated which programs a descent for the aircraft. If no objects at all are detected by the radar, a signal may be generated to indicate a possible failure, or malfunction, of the system.

Referring now to FIG. 2, it may be observed that the system of the present invention comprises a conventional radar system designated generally by the dashed line 21 which operates in conjunction with a conventional radar antenna 26. A unique variable delay network 27 functions to insure that the desired scan profile, or template is being scanned by the radar. Signals from the conventional radar system 21 and from the variable delay network 27 are used in conjunction with the return radar signals, for the generator of "Climb" and "Dive" flight control command signals in a flight control logic network 39. The return radar pulses received by the conventional radar system 21 and fed to the flight control logic 39 are thus compared in time with the scan profile signals from the variable delay network 27 to derive the proper flight control command signals to maintain the aircraft or missile in a low flight over ground terrain while avoiding abrupt projections of the ground terrain.

The radar system 21 may comprise any conventional radar system suitable for use in conjunction with the terrain avoidance system of the present invention, although in a preferred embodiment of the invention a monopulse resolution improvement radar (MRI) is preferred. Such a system comprises a pulse repetition frequency (PRF) controlled master trigger generator 22 which activates a transmitter 23 to initiate the emission of the radar pulses which are fed through an isolating device 25 to a conventional radar antenna 26. The isolating device 25 is used to prevent the transmitted pulses from being sent to the receiver and may comprise conventional means for such purposes, for example, a circulator or a blanking pulse generator. The pulsing of the transmitter 23 causes a radar carrier signal pulse to be transmitted from the conventional radar antenna 26, and the electromagnetic energy radiated from the antenna 26 travels through space until striking an object 20, which may be terrain or other obstacles. The object 20 will cause a reflected pulse of the carrier to be received by the antenna 26 and sent via the isolating device 25 to the receiver 24.

At the same time that the master trigger generator 22 pulses the transmitter 23 to initiate the emission of a radar pulse, the trigger generator also pulses the variable delay network 27 to initiate its operation and sets the flight control logic network 39. The variable delay network 27 then passes through its operation cycle to produce a predetermined variable time delay depending upon what elevation angle of the template is presently being scanned by the radar antenna 26. At the completion of the time delay, a pulse is emitted from the variable delay network 27 and applied to the flight control logic network 39. Therefore, if a return pulse from the object 20 is received by the radar system and sent to the flight control logic network 39 before the pulse from the variable delay network 27 arrives at flight control logic network 39, this indicates that the object 20 lies within the scan profile ABCDE of FIG. 1, and the flight control logic 39 will generate a flight control signal commanding the aircraft or missile to climb at a rate proportional to the time delay between the two pulses. On the other hand, if the object 20 lies outside of the scan profile, the time required for the radar pulse to travel from the antenna 26 to the object 20 and back will be greater than the time delay provided by the variable delay network 27. For this case the flight control logic 39 will generate a "Dive" command because the object 20 lies outside of the scan template and the aircraft or missile will dive at a rate proportional to the time delay between the two pulses. It will now be apparent that the variable delay network 27 provides a time delay which coincides with the time required for an emitted radar pulse to travel from the aircraft to the extremity of the scan profile and back to the aircraft, and of course, this delay will vary in accordance with the distance from the aircraft to the edge of the scan profile as the antenna sweeps from its lower extremity of scan at $-\beta$ to its upper scan extremity at $+\alpha$.

The variable delay network 27 will now be described in more detail with specific reference to FIG. 3, and its manner of operation in producing the controllably variable delay will be explained. The variable delay network 27 is comprised of two main signal channels, the first including a first monostable multivibrator 28, a first integrator 29, and a first comparator 30; while the second channel includes a second monostable multivibrator 31, a second integrator 32, and a second comparator 33. The monostable multivibrators 28 and 31 are conventional blocking oscillators which have only a single stable state so that when an input pulse is applied, the multivibrator will provide a high voltage output for a selected interval of time, after which it will automatically return to its stable state in which the high voltage output is not longer present. The integrators 29 and 32 are conventional RC integrating networks, and since step voltage waveforms from the monostable multivibrators 28 and 31 are applied to their respective inputs, the integrators 29 and 32 will produce essentially ramp voltage outputs. The comparators 30 and 33 are also conventional, and each functions to compare its input voltage from the respective integrator with a preset reference voltage. The preset reference voltages are designated as "Preset Trigger Level 1" for the comparator 30 and "Preset Trigger Level 2" for the comparator 33. As long as the voltage applied to the preset trigger level is greater than the voltage furnished by the respective integrator, no output will be provided by the comparator. However, when the ramp voltage from the integrator increases to the point where it equals the preset trigger reference voltage, the comparator will then provide an output pulse. The output pulses from the comparators 30 and 33 are fed to an amplifier 35 in order to bring their magnitudes up to desired levels. It should be apparent, however, that the amplifier 35 would not be necessary if comparators were used which could furnish output voltages of the desired magnitudes.

Potentiometers 41 and 42 are connected as part of the resistance elements in the respective RC integrating circuits 29 and 32, and the respective taps on the potentiometers 41 and 42 are moved in accordance with the position of the antenna 26. Thus, the time constants for the respective integrators 29 and 32 are changed as a function of the movement of the antenna 26. More specifically, as the antenna 26 moves upward in its scan, the resistances in the RC integrating circuits are increased so that longer times are required for the respective ramp voltages to reach the predetermined reference trigger voltage levels applied to the comparators 30 and 33.

A differentiator circuit 34 is connected to the output of the second monostable multivibrator 31 and serves to differentiate the trailing edge of the output from multivibrator 31 to produce a sharp timing pulse when the multivibrator 31 returns to its stable state. The output from the differentiator 34 provides the constant range portion of the scan template.

The operation of the variable delay network of FIG. 3 will now be described. It should be kept in mind that the scan template ABCDE of FIG. 1 provides an outline of the ranges within which it is desired that no terrain or obstacles project relative to the aircraft 15. The extremities, or outer ranges, of the scan template are represented by the straight line A, the straight line B and the curved line C. Thus, it will be apparent that in order to achieve the desired scan profile, the delay provided by the variable delay network 27 must be changed at a first rate while the outer limit of scan is moving along the line A, then must be shifted at a greater rate while the scan limit travels along the line B, and then must be maintained constant while the antenna scans along the arc C.

The voltage waveforms produced by different parts of the variable delay network of FIG. 3 are illustrated in FIG. 4. More specifically, output voltages from the monostable multivibrators 28 and 31 are shown in FIG. 4a, and it will be apparent that these voltages are present for a time designated as $t_6$, which is the time required for a radar pulse to travel from the aircraft 15 to the arc C and back to the aircraft. It should be pointed out that in order to promote simplicity in describing the operation of the variable delay network, it will be assumed that the outputs from the respective multivibrators 28 and 31 are present for the same duration of time. However, this is not necessary for the operation of the system and, in fact, designing the system with different time constants for the respective monostable multivibrators 28 and 31 is well within the purview of the invention.

The trigger pulse from the master trigger generator 22 which causes the transmission of a radar pulse from the antenna 26 also triggers the monostable multivibrators 28 and 31 to initiate the waveforms shown in FIG. 4a. The integrators 29 and 32 integrate the step waveforms of FIG. 4a to produce the ramp voltages illustrated in FIG. 4b. The time constants of the respective integrators are different, with the time constant of the integrator 32 initially being longer than the time constant of the integrator 29. Thus, the output voltage from the integrator 29 reaches its predetermined reference level $a$ at time $t_1$, whereas the output voltage from the second integrator 32 reaches its predetermined comparison level $a$ at a later time $t_2$. Again, the predetermined reference levels (designated as "-Preset Trigger Level 1" and "Preset Trigger Level 2" for the first and second comparators, respectively) will be assumed to be equal in order to promote simplicity in describing the operation of the system. However, it should be obvious that the preset trigger levels do not have to be the same.

The time $t_1$ is that time required for a radar pulse to travel from the aircraft 15 to the point $a$ of FIG. 1 and back to the aircraft, and "Preset Trigger Level 1" for the comparator 30 is set so that the comparator 30 is triggered at time $t_1$. At this time the comparator 30 produces an output pulse which is applied to the flight control logic network 39. At time $t_2$, which is the time required for the radar pulse to travel from the aircraft 15 to point $a'$ and back to the aircraft, the output voltage from the second integrator reaches the level of the reference voltage applied to "Preset Trigger Level 2" on the second comparator 33, and at this time the second comparator 33 produces an output pulse. This pulse also is applied to the flight control logic 39. However, flight control logic network 39 has already received the first comparator output and therefore the output pulse from the second comparator 33 will have no effect since the first output pulse activates the "Climb" or "Dive" control.

As the radar antenna 26 begins to sweep upward from its initial angle of $-\beta°$ with respect to the flight vector of the aircraft, the movement of the radar antenna is made to effect desired corresponding movements of the taps on the potentiometers 41 and 42. This increases the resistance values in the RC integrators 29 and 32, thereby increasing the time constants of the integrators. The resistance values and the potentiometer tap movements are made such that the time constant of the first integrator 29 is caused to increase at a faster rate than that of the second integrator 32. The reason for this is that the change in the time constant for the first integrator 29 corresponds to a movement of the scan limit along the line A (from point $a$ to point $b$), while the change in the time constant of the second integrator 32 corresponds to a sweep along the dashed extension of line B (from point $a'$ to point $b$).

When the position of the antenna is such that radar pulses are being beamed toward point $b$, the time constants for the first and second integrators have become identical, as is shown in FIG. 4c. The time required for a radar pulse to travel from the aircraft to point $b$ and back is $t_3$. At this point both the first and second comparators 30 and 33, respectively, reach their preset comparison levels at the same time, namely at $t_3$.

As the radar antenna continues on its upward sweep, the time constant for the first integrator 29 increase at a faster rate than the time constant for the second integrator 32, and the second integrator 32 will reach its preset comparison voltage level first. This condition is illustrated in FIG. 4d. For the specific case illustrated, radar pulses are being beamed toward point $x$ which lies at a distance from the aircraft 15 corresponding to a radar pulse travel time of $t_4/2$. The second integrator 32 will reach its preset comparison voltage level at time $t_4$ and the second comparator will apply the first output pulse to the flight control logic network 39. At time $t_5$, which is the travel time of a radar pulse from the aircraft to point $x'$ and back, the output voltage from the first integrator 29 will reach its preset comparison level, and the first comparator 30 will then pulse flight control logic network 39. However, this pulse will have no effect because the flight control logic network 39 has already received the second comparator 33 pulse.

As the radar antenna continues its upward scanning movement, it will eventually be beaming pulses at point $c$. For this case, which is shown in FIG. 4e, the output voltage from the second integrator 32 reaches its preset comparison level at time $t_6$, which is the travel time of a radar pulse from the aircraft to point $c$ and back. Thus, the flight control logic network 39 is now pulsed at time $t_6$.

After the radar antenna has passed through point $c$ and continues its upward sweep along line C, the second monostable multivibrator 31 will switch back to its stable state (thus ending its $t_6$ output pulse) before the output from the second integrator 32 has become large enough to trigger the second comparator 33. However, at $t_6$ the differentiator 34 will produce a spike output voltage at the trailing edge of the $t_6$ pulse, and this spike will be fed through the amplifier 35 to the flight control logic network 39. Thus, while the radar antenna is scanning along the arc C, the constant range portion of the scan profile, flight control logic network 39 receives a pulse at a constant time $t_6$ after the emission of each radar pulse. It can be recognized from FIG. 3 that the output spike from differentiator 34 will be present for all scan angles of the antenna, but said output will only be effective for those angles commencing with point $c$ and subtended by arc C (of FIG. 1).

The variable delay network of FIG. 3 may readily be adjusted to change the altitude of the flight vector to be maintained. By adjusting the preset trigger 1 level it is possible to increase or decrease the travel time of the radar pulses from the antenna along the slant range to the perimeter A of the scan profile. Likewise, by adjusting the preset trigger 2 level it is possible to increase or decrease the travel time of the radar pulses from the antenna along the slant range to the perimeter B of the scan profile. Moreover, it should be appreciated that the pulse duration of the monostable multivibrators may be rapidly adjusted by variable resistor or capacitor networks to maintain a desired variable maximum range of the scan profile. By the above adjustments it is believed apparent that the scan profile may be varied according to the desired terrain clearance and maximum range for a particular aircraft.

When the radar antenna has reached the upper limit of its scan, i.e., an angle of $+\alpha°$ with respect to the flight vector of the aircraft, the upward movement of the antenna is stopped, and the antenna is caused to move in a downward sweep. The variable delay network 27 will then operate in a manner inverse to that described above, i.e., the time constants for the respective integrators will be decreased in accordance with the downward movement of the antenna, and the appropriate waveforms and timing pulses will be produced so as to cause the outer limit of the scan to move along the arc C, the line B and the line A.

The flight control logic system 39 is used to generate the signals for controlling the maneuvering of the aircraft or missile over the terrain in accordance with the return radar signals from the receiver 24 and the control signals from the variable delay network 27 which indicates the end of the "Climb" sector and start of the "Dive" sector of the scan template or profile. Although many types of logic systems may be suitable for this purpose, a preferred embodiment of the flight control logic is shown in FIG. 5. According to this embodiment, the return radar signals from the receiver 24 are fed to a monostable multivibrator 80, which is of the same type as the multivibrators 28 and 31 of FIG. 3, and the output signal from the monostable multivibrator 80 is applied to an RC video integrator 81 of the same type as the first and second integrators 29 and 32 of FIG. 3. The output from variable delay network 27 is fed to monostable multivibrator 70. The output of monostable multivibrator 70 is one input to bistable m.v. 71 and the other input is the master trigger generator 22. The monostable multivibrator 70 has a pulse duration equal to one half the pulse duration of monostable multivibrator 80. The output from the integrator 81 is connected to one input of an AND gate 82. The output of bistable multivibrator 71 is the other input to AND gate 82.

From the above it will be understood that the bistable multivibrator 71 holds AND gate 82 open until the output from variable delay network 27 occurs, which indicates termination of the "climb" sector and initiation of the "dive" sector of the scan profile, and then an additional period equivalent to half the pulse duration of monostable multivibrator 80. In this manner, bistable multivibrator 71 is delayed in switching for a period which will be explained later. The AND gate 82 passes the ramp voltage from the integrator 81 at a level from 0 to V volts depending on the time relation between the radar video return (obstacle return) and the first pulse from the variable delay network 27 which occurs at the termination of the "climb" sector and start of "dive" sector portion of the scan profile.

The ramp voltage output from the AND gate 82 is passed through a transistor emitter follower circuit 83. The output from the emitter follower circuit 83 is amplified in a video amplifier 84, after which it is sent through an emitter follower circuit 85 of the same type as the circuit 83. The output from the emitter follower 85 is connected to two peak detectors 86, the first of which operates during the upswing of the antenna, while the second is used during the downswing of the antenna. The peak detectors furnish a DC output voltage proportional to the maximum value of the varying voltage (integrator 81 ramp voltage passed by AND gate 82) applied to their inputs. The output from the peak detectors 86 is fed to an autopilot signal generator 87 which provides the proportional "Climb" and "Dive" flight control signals. At the completion of each scan of the antenna an "End of Scan Trigger" pulse is applied to the peak detectors 86 to reset them to their initial condition.

From the above, it should be appreciated that the magnitudes of the respective "Climb" and "Dive" command signals are proportional to the degree of climb or dive indicated by the proximity of obstacles to be avoided. Thus, a proportional type of control (rather than simply an on-off control) is afforded, with the magnitudes of the "Climb" and "Dive" control signals being a function of the distance between the aircraft and the detected obstacles.

In the operation of the flight control logic of FIG. 5, when a radar pulse is emitted by the antenna, the master trigger generator 22 sets the bistable multivibrator 71 to the first state. Thus, AND gate 82 is open to pass the output of integrator 81. The return radar signals from the receiver 24 are used to trigger the monostable multivibrator 80, which then generates a step voltage waveform. This waveform is integrated by the video integrator 81 into a ramp voltage, and the ramp output of the integrator 81 is gated with the output signal from the first state of bistable multivibrator 71. As long as the radar is investigating the area within the scan template, the variable delay network 27 will not have pulsed monostable multivibrator 70 thereby resetting the bistable multivibrator 71 to the second state, and the AND gate 82 will remain open. However, after sufficient time has elapsed for the radar pulse to reach the outer limit of the scan template and return, the variable delay network 27 will pulse monostable multivibrator 70 thereby resetting the bistable multivibrator 71 to the second state, after a delay, and the AND gate 82 will be gated off terminating the ramp output from the video integrator 81. Thus, the portion of the ramp which is allowed to pass through the AND gate 82 is dependent upon what point in time, an output from the variable delay network 27 occurs. This, of course, is dependent upon the position of the detected object relative to the outer limits of the scan profile, with the ramp voltage generally being initiated earlier when an object is located well within the scan profile and close to the aircraft than for an object located outside of the scan profile and farther away from the aircraft.

The manner in which the proportional "Climb" and "Dive" command signals are generated in accordance with the passage of varying portions of the ramp voltage through AND gate 82 will be best understood by making reference to the voltage waveforms shown in FIG. 6. Fig. 6a illustrates the antenna has emitted a radar pulse at a given angle with the flight vector. The time $t$ indicates the edge of the scan template at which the "climb" sector terminates and the "dive" sector begins. At this point monostable multivibrator 70 is triggered. The output is differentiated to give a leading edge spike and trailing edge spike. After a period of time T, the trailing edge spike occurs and monostable multivibrator 70 returns to its stable state. The trailing edge spike switches bistable multivibrator 71 to its second stable state which then turns the AND gate 82 from on to off.

FIG. 6b illustrates the case in which an object is detected at a distance from the aircraft in which it is desired that no output signal be sent to the autopilot, i.e., neither a "Climb" nor a "Dive" command. At the time $t$, a video return is received at monostable multivibrator 80 which is also the time when the climb sector of the scan template terminates. Monostable multivibrator 70 provides a time delay T prior to closing the AND gate. The radar video return from receiver 24 initiates monostable multivibrator 80 which has a pulse duration of 2T. Integrator 81 generates a ramp voltage which is passed through AND gate 82. Since AND gate 82 is switched off at T time after the video occurs, the ramp voltage through the AND gate terminates at the time T having reached V/2 volts (shaded portion of FIG. 6b). The ramp voltage, being for this example V/2, is passed through emitter follower 83, video amplifier 84, emitter follower 85 and into peak detector 86. The output of peak detector 86 is a DC signal of V/2 volts and corresponds to the ramp voltage V/2. This DC voltage is sent to the autopilot signal generator 87. The autopilot signal generator 87 subtracts V/2 volts from the input applied by the peak detectors 86 which in this example is V/2 volts. Hence the autopilot signal generator 87 sends a null or zero, command voltage to the autopilot (not illustrated).

FIG. 6c illustrates video being received prior to the termination of the climb sector on the scan template. In other words, as illustrated, a radar video return occurs prior to time $t$. The initiation of the ramp voltage generation begins with the video pulse into monostable multivibrator 80. As illustrated, the ramp voltage is generated for a period of time T/2 before the climb sector terminates. Therefore, the ramp voltage is generated for 1/2 T + T. In this case the ramp voltage has built to a level greater than V/2 (shaded portion of FIG. 6c) during the period when the AND gate 82 is open. This ramp voltage is passed through emitter follower 83, video amplifier 84, emitter follower 85 to peak detectors 86. The output of the peak detector which is proportional to a voltage greater than V/2 volts is fed to the autopilot signal generator 87. As illustrated in FIG. 6c, the peak detectors 86 apply a voltage of approximately ¾ V volts to the autopilot signal generator 87 which subtracts V/2 volts from the input thereto. Thus, a positive V/4 volts is sent to the autopilot thereby providing a "-Climb" command signal.

FIG. 6d illustrates the occurence of video after the climb sector of the scan template terminates. This means that the video occurred after time $t$ but during time T when the AND gate was still on. Therefore, the ramp voltage output passed through the AND gate will be less than V/2 volts. The ramp output through the AND gate goes through the emitter follower 83, the video amplifier 84, the emitter follower 85 to the peak detectors 86. The output from the peak detectors 86 which is proportional to a voltage less then V/2 volts (shaded portion of FIG. 6d) is fed to the autopilot signal generator 87. As illustrated in FIG. 6d, the peak detectors 86 apply a voltage of approximately V/4 volts to the autopilot signal generator 87 which subtracts V/2 volts from the input thereto. Thus, a negative V/4 volts is sent to the autopilot thereby providing a "dive" command signal.

It should be appreciated that if the entire ramp voltage of V volts is generated prior to the AND gate 82 being turned off by bistable multivibrator 71, a maximum "Climb" command will be generated by the autopilot signal generator 87. Likewise, if the AND gate is cut off prior to radar video returns operating monostable multivibrator 80 none of the ramp voltage will be passed through the AND gate to the autopilot signal generator 87, and a maximum dive command will be generated. From the above it will be understood that the "Dive" and "Climb" commands are generated proportional to the location of radar video returns with respect to the termination and start of the "Climb" and "Dive" sectors, respectively.

The system provided by the present invention possesses numerous advantages over prior art computing terrain avoidance systems in which the radar supplies range and angle information, computes the relative height of an obstacle, and issues an appropriate command based on the aircraft response capabilities. With the system of the present invention, if vertical downward winds suddenly cause the aircraft to accelerate downward, the ground immediately moves into the scan profile, and the aircraft is at once responding to a "Climb" command signal. Overshoot is minimized because the sloping front (line B) of the scan enables the aircraft to return rapidly to its set clearance altitude. Except when obstacles exist, the command signals are generated a very short distance in front of the aircraft in order to make possible very accurate altitude determinations. Thus, the aircraft is readily maintained in a low flight over ground terrain and automatically guided over any abrupt projections of the ground terrain.

Although the present invention has been shown and described with reference to a particular embodiment, nevertheless various changes and modifications obvious to those skilled in the art are deemed to be within the spirit, scope, and contemplation of the invention.

We claim:

1. A terrain avoidance radar system for an airborne vehicle comprising transmitter means for sending radar signals into a predetermined region in front of said airborne vehicle to detect the presence of an obstacle in said predetermined region, at least a portion of said predetermined region comprising a scan profile, a portion of the boundary of said scan profile lying at a distance from said airborne vehicle which varies in accordance with its angular position with respect to said airborne vehicle, receiver means for receiving the return radar signals, proportional flight control logic means connected to said receiver means and effective responsive to the receipt of reflected radar signals for producing flight control command signals proportional to the proximity of the detected obstacles to said portion of the boundary of said scan profile to control the flight path of said airborne vehicle to avoid the detected obstacles, said control logic means including a bistable device for enabling the generation of said flight control command signals in said flight control logic means, means connected to said bistable device for placing said bistable device in a first stable state when a radar pulse is emitted into said predetermined region, and means connected to said bistable device for placing said bistable device in a second stable state a preselected time interval after sufficient time has elapsed for said radar pulse to travel to said portion of the boundary of said scan profile and back to said airborne vehicle, said flight control logic means being enabled only when said bistable device is in said first stable state.

2. A terrain avoidance radar system according to claim 1 wherein said proportional flight control logic means further includes means connected to said receiver means for generating a signal in response to the receipt of a return radar pulse by said receiver means, gating means connected to receive an output signal from said bistable device and said generated signal, said gating means being effective to pass said generated signal only when said bistable device is in said first stable state, and means for producing said flight control command signals as a function of the generated signal passing through said gating means when said bistable device is in said first stable state.

3. A terrain avoidance radar system according to claim 1 wherein said proportional flight control logic means further includes means connected to said receiver means for generating a ramp voltage in response to the receipt of a return radar pulse by said receiver means, gating means connected to receive said ramp voltage and the output of said bistable device, said gating means being effective to pass said ramp voltage responsive to said bistable device being in said first stable state, and means responsive to the peak amplitude of the ramp voltage passed by said gating means for generating said flight control command signals as a function of the peak amplitude of said ramp voltage passed by said gating means.

4. A terrain avoidance radar system according to claim 3 wherein said proportional flight control logic means is effective to generate no output signal when said ramp voltage is initiated a predetermined time prior to the time said bistable device is placed in said second stable state, generate an output signal of first character when said ramp voltage is initiated at a time greater than said predetermined time prior to the time said bistable device is placed in said second stable state, and to generate an output signal of a second character when said ramp voltage is initiated at a time less than said predetermined time prior to the time said bistable device is placed in said second stable state, the peak amplitude of said first and second output signals being a function of the difference between said predetermined time interval and the time interval between the time said ramp voltage is initiated and the time said bistable device is placed in said second stable state.

5. A terrain avoidance radar system according to claim 4 further including control means, means for connecting an output of said flight control logic means to said control means, said control means being effective to cause the angle of the flight vector of said airborne vehicle to be increased with respect to the horizontal in response to said first output signal and causing the angle of the flight vector of said airborne vehicle to be decreased with respect to the horizontal in response to said second output signal.

6. A terrain avoidance radar system for an airborne vehicle comprising transmitter means for sending radar signals into a predetermined region in front of said airborne vehicle to detect the presence of an obstacle in said predetermined region, at least a portion of said predetermined region comprising a scan profile, a portion of the boundary of said scan profile lying at a distance from said airborne vehicle which varies in accordance with its angular position with respect to said airborne vehicle, receiver means for receiving the return radar signals, proportional flight control logic means connected to said receiver means and effective responsive to receipt of reflected radar signals for producing flight control command signals proportional to the proximity of the detected obstacles to said portion of the boundary of said scan profile to control the flight path of said airborne vehicle to avoid the detected obstacles, said control logic means including a bistable device for enabling the generation of said flight control command signals in said flight control logic means, means connected to said bistable device for applying a trigger pulse to said bistable device to place said bistable device in a first stable state when a radar pulse is emitted into said predetermined region, variable time delay means including a preselected time delay means for applying timing signals to said bistable device, said timing signals being changed in accordance with sad variation of said portion of the boundary for said scan profile for placing said bistable device in said second stable state a predetermined time interval after sufficient time has elapsed for said radar pulse to travel to said portion of the boundary and return, the duration of the time said bistable device is maintained in said first stable state being changed at a first rate during a first interval of time, said duration being changed at a second rate during a second interval of time, and said duration remaining constant during a third interval of time, said variable time delay means including means for producing a first pulse at a predetermined time after said trigger pulse, said predetermined time varying at said first rate, means for producing a second pulse at a preselected time after said trigger pulse, said preselected time varying at said second rate, means for producing a third pulse at a constant time after said trigger pulse, said first pulse occurring first in time during said first time interval, said second pulse occurring first in time during said second time interval, said third pulse occurring first in time during said third time interval, and means for applying said first, second and third pulses to said bistable device to place said bistable device in said second stable state.

7. A terrain avoidance radar system according to claim 6 wherein said proportional flight control logic means further includes means connected to said receiver means for generating a signal in response to the receipt of a return radar pulse by said receiver means, gating means connected to receive the generated signal and a signal from said bistable device, said gating means being effective to pass said generated signal only responsive to said bistable device being in said first stable state, and means for producing said flight control command signals as a function of the generated signal passing through said gating means when said bistable device is in said first stable state.

8. A terrain avoidance radar system according to claim 6 wherein said proportional flight control logic means further includes means connected to said receiver means for generating a ramp voltage in response to the receipt of a return radar pulse by said receiver means, gating means connected to receive said ramp voltage and a signal from said bistable device, said gating means being effective to pass said ramp voltage only responsive to said bistable device being in said first stable state and means responsive to the peak amplitude of the ramp voltage passed by said gating means for generating said flight control command signals as a function of the peak amplitude of said ramp voltage passed by said gating means.

9. A terrain avoidance radar system according to claim 8 wherein said proportional flight control logic means generates no output signal when said ramp voltage is initiated a predetermined time prior to the time said bistable device is placed in said second stable state, generates a first output signal when said ramp voltage is initiated at a time greater than said predetermined time prior to the time said bistable device is placed in said second stable state, and generates a second output signal when said ramp voltage is initiated at a time less than said predetermined time prior to the time said bistable device is placed in said second stable state, the magnitudes of said first and second output signals being a function of the difference between said predetermined time interval and the time interval between the time said ramp voltage is initiated and the time said bistable device is placed in said second stable state.

10. A terrain avoidance radar system according to claim 9 further including means for causing the angle of the flight vector of said airborne vehicle to be increased with respect to the horizontal in response to said first output signal and said means further causing the angle of the flight vector of said airborne vehicle to be decreased with respect to the horizontal in response to said second output signal.

11. An electrical network for producing an output voltage level varying about a reference voltage level, part of said level varying proportional to the time interval between the occurence of a first pulse and a second pulse comprising means to generate a variable time duration signal, means to generate the first pulse at the termination of said time duration signal and further to delay said first pulse for a preselected period, means to detect the occurence of the second pulse after the initiation of said variable time duration signal, means responsive to the detection of said second pulse to generate a ramp voltage having a time duration twice said preselected period, means connected to receive said first pulse and said ramp voltage to detect the ramp voltage level at coincidence between said first pulse delayed for said preselected period and a portion of said ramp voltage, and means to derive the output voltage level varying from said reference voltage level as a function of the peak amplitude of said ramp voltage level detected by said last named means.

12. An electrical network for producing an output voltage level varying about a reference voltage level, said output voltage level varying about said reference voltage proportional to the time relation between the occurence of a first pulse and a second pulse, said output voltage level varying increasingly above said reference level when said second pulse occurs increasingly before said first pulse, said output voltage level varying increasingly below said reference voltage level when said first pulse occurs increasingly after said second pulse, and said output voltage level being equal to the reference voltage level when said first pulse and said second pulse occur coincidentally, said network comprising means to generate a variable time duration signal, means to generate the first pulse at the termination of said variable time duration signal and further to delay said first pulse for a preselected period, means to detect the occurence of said second pulse after the initiation of said variable time duration signal, means responsive to the occurence of said second pulse to generate a ramp voltage having a duration twice said preselected period, means responsive to said delayed first pulse and said ramp voltage to detect the ramp voltage level at the end of said preselected period, and means to generate said output voltage level as a function of the path amplitude of the ramp voltage detected by said last named means.